Jan. 26, 1965  P. R. GEORGE, SR  3,167,093
PULSATOR RELAY
Filed May 18, 1962
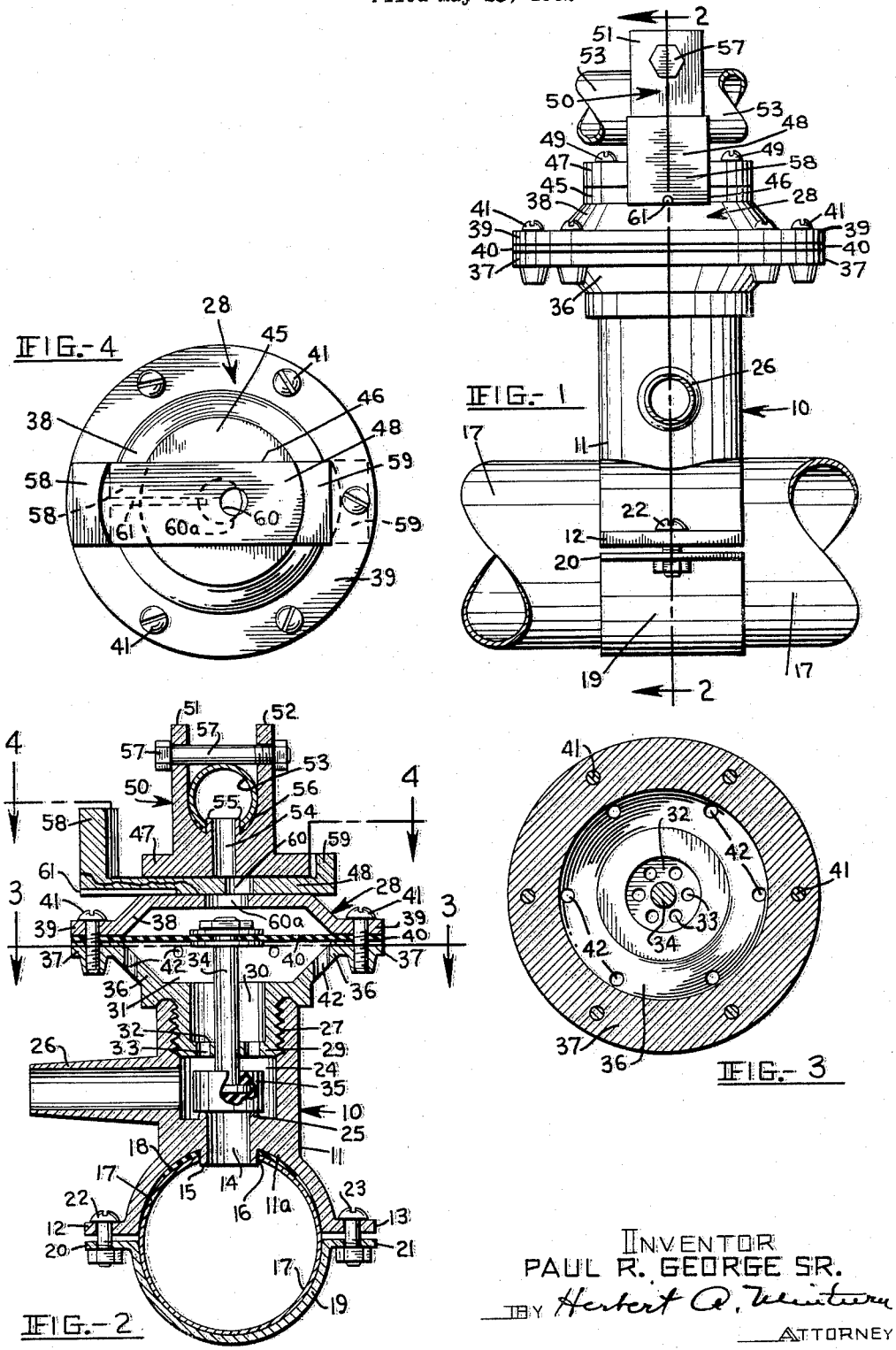
INVENTOR
PAUL R. GEORGE SR.
BY Herbert A. Winters
ATTORNEY 3,167,093
PULSATOR RELAY
Paul R. George, Sr., New Castle, Ind., assignor to
Golay & Co., Inc., Cambridge City, Ind.
Filed May 18, 1962, Ser. No. 195,685
1 Claim. (Cl. 137—625.27)

This invention relates to a device utilizing a pulsating pressurized line to apply a pulsating pressure from a constant pressure line to some such device as a milker.

It has been a practice in the dairy industry in milking cows to use a milking machine having a head on which is mounted a pulsator operating from a vacuum line to apply intermittently atmospheric pressure and a partial vacuum to a teat cup to the space within cup and outside of an inflation carried therein whereby the inflation is intermittently closed and opened over the end of the cow's teat so as to, in effect, open and close a constant vacuum line through which milk flows from the teat. The purpose of this construction is, as is well known, to prevent a constant vacuum being applied to the cow's teat which would be quite damaging. This particular structure is well known to those versed in the art.

One of the objections to using a pulsator on each milking unit was that the pulsators did not all operate at the same speed of pulsating and therfore the cows would be subjected to different milking speeds from milking time to milking time where the same pulsator unit was not employed for that particular cow each time. A second objection was that these pulsators required attention from time to time delaying the milking or requiring replacement of pulsators. Therefore the more pulsators used the more time out might be required.

With the advent of the pipeline system, a practice has grown up whereby an entire vacuum line is pulsated by one pulsator. This of course insures a constant pulsating speed at each of the milking claws and their affixed teat cups at each milking station. However on a long line, these pulsations might become rather "weak" at the far end of the pulsated line, resulting in improper action.

It is the purpose of this invention to overcome these problems as stated, by using a pulsated pressure line which may be of relatively small diameter. By the term "pulsated pressure" it is meant that the pressure in the line will vary regularly from approximately atmospheric pressure to a vacuum at a predetermined rate. The word "vacuum" is employed in the description of the present invention in the sense that it does not mean an absolute vacuum, but only a partial vacuum. Therefore in all instances of the use of the term vacuum, a partial vacuum is meant. The vacuum in this pressure line is of the same level as it is in a vacuum supply line which is of a much larger diameter so that upon connections being made to this supply line, the degree of vacuum therein will not fluctuate appreciably. In other words the supply line is intended to be approximately constant in its vacuum pressure.

The invention has to do with the application of the pulsations set up in the pulsating line to operate a valve intermittently between a connecting tube leading to the milking claw and the vacuum supply line, this interconnection between the tube and the supply line being pulsated in accordance with the pulsations in the supply line.

Through the use of the invention herein described, but one pulsator need be employed to control the pulsations in the supply line, and then there is a relay at each milking station to transfer in effect the pulsations of the supply line (without any air flow therefrom or thereinto) to the supply vacuum to the milking claw.

A further important object of the invention is to provide an exceeding simple construction for the purposes above indicated and one which will have a very long life in usage and which will be extremely reliable in its operation, free of stoppages and the like.

Also the device constituting invention may be quickly and simply installed and furthermore may be manufactured at a relatively low price.

These and many other objects and advantages of the invention will become apparent to those versed in the art in the following description of one particular form of the invention as illustrated in the accompanying drawing, in which—

FIG. 1 is a view in side elevation of a structure embodying the invention;

FIG. 2 is a view in vertical section on the line 2—2 in FIG. 1;

FIG. 3 is a view in transverse section on the line 3—3 in FIG. 2; and

FIG. 4 is a view in top plan on the line 4—4 in FIG. 2.

A body generally designated by the numeral 10 has an underside approximately semicylindrical in shape, designated by the numeral 11, and from the lower ends thereof carries outturned ears 12 and 13. There is a vertical bore 14 extending upwardly through the body 10. A nipple 15 extends downwardly from the body surface 11 and through which the bore 14 extends, FIG. 2. This nipple 15 enters a hole 16 in a constant vacuum supply pipe 17. A gasket 18 surrounds the nipple 15 and lies between the body surface 11 and the pipe 17, and then an underband 19 having outturned ears 20 and 21 is pulled upwardly against the underside of the pipe by a suitable means, herein shown as by means of the bolts 22 and 23, thereby giving a pressure seal between the pipe 17 and the underside of the body 10, from the surface 11a immediately adjacent the protruding nipple 15.

The bore 14 opens into a cylindrical chamber 24 in the body 10, FIG. 2, the diameter of this chamber 24 exceeding the diameter of the bore 14. A rib 25 extends around the opening of the bore 14 within the chamber 24, and serves as a valve seat. A tube coupling nipple 26 extends from the side of the body 10 for a distance sufficient to permit engaging a tube thereover, this being the tube which leads to the milking claw and in turn to the inside of the teat cup to control the flexing of the inflation carried therein, the tube, milking claw and teat cup not being herein shown since they per se do not constitute a part of the invention, and in any event are well known to those versed in the art.

The upper end portion of the body 10 above the cylinder 24 is internally screw-threaded as at 27.

A diaphragm carrier generally designated by the numeral 28 has an extending nipple 29 externally screw-threaded and engaging screw-threadedly with the threads 27 of the body 10. This nipple 29 has a vertically disposed bore 30 opening entirely across its upper end into a diaphragm chamber 31, and having a lower closure 32 through which a plurality of openings 33 are provided. The central portion of the closure 32 serves as a guide for slidingly supporting a rod 34 which extends downwardly into the chamber 24 and carries a valve head 35 thereon to selectively seat by its underside on the rib 25 as indicated in FIG. 2. This head 35 is preferably made out of a resilient material so that a substantially air tight seal may be had between the head 35 and the rib 25 so as to control air flow from the constant vacuum pipe 17 and also thereinto. The carrier 28 has a lower upwardly and outwardly flaring wall 36 turning outwardly into an annular flange 37. The carrier 28 also has an upper enclosing cap 38 which is dished from its underside and carries an annular flange 39 of the same diameter as that of the flange 37.

A flexible, elastic diaphragm 40 is circular in nature and has its outer peripheral edge portion clamped between the two flanges 37 and 39 and there secured in air tight condition by any suitable means, herein shown as by screws 41 passing down through the flange 39, through the diaphragm 40, and into the flange 37. The rod 34 is fixed centrally of and to the diaphragm 40, FIG. 2, with an air tight connection therewith. The wall 36 is provided with a plurality of openings 42 therethrough, opening from the atmosphere into the space of the chamber 31 below the diaphragm 40. There is no air connection or possible flow from one side of the diaphragm 40 to the other side.

The carrier 28 terminates in an upwardly directed boss 45, FIG. 1, and this boss 45 is provided with a transverse slot 46 thereacross and receives across its topside a bracket base 47. A rectangular slide valve 48 is slidingly guided within the slot 46, and is slidingly retained therein by the underside of the base 47, FIG. 2. This base 47 is secured against the topside of the boss 45 by any suitable means, herein shown as by the screws 49. The bracket base 47 carries the upper bracket structure 50 which is bifurcated to have the two upturned arms 51 and 52 to receive therebetween the pulsating pipe 53. The base 47 has an upwardly extending bore 54 leading from its underside and opening from a nipple 55 entering the pipe 53 and being sealably interconnected therewith by means of a gasket 56 surrounding the nipple 55 and bearing against the outer side of the pipe 53. The pipe 53 is held compressively against this gasket 56 by means of a bolt 57 passing through the two members 51 and 52 and over and in contact with the pipe 53.

The valve 48 has upturned ends 58 and 59 as means for limiting the travel in the slot 46. Also the one end, end 58, is of sufficient dimensions as to permit it to serve as a handle for operating the valve 48. The valve 48 has a passageway or opening 60 therethrough to selectively register in part at least with the lower end of the bore 54, in the bracket base 47 and a passageway 60a in the top of the carrier member 28, FIG. 2. Thus by sliding the valve 48 to and fro, interconnection may be had between the pipe 53 and the topside of the diaphragm 40. The underside of the valve 48 is provided with a slot 61 extending inwardly thereunder from the outer end at the member 58 for a distance to terminate over the opening 60a when the member 58 is pushed to the right, FIG. 2, to abut the member 47.

*Operation*

It is to be noted that there are no pistons which sliding fit in the construction as described, and thus friction is avoided and also wear is eliminated accordingly.

The pulsating line or pipe 53 will be pulsating between atmospheric pressure and a vacuum, such as is measured by a column of mercury eleven inches high. The degree of vacuum of course may be increased if so desired. One particular pipe size suitable to the successful operation of the device has an internal diameter of one-half inch.

The constant vacuum pipe 17 has a much larger diameter of approximately one and one-half inches. As has been indicated, this pipe 17 is maintained at a vacuum level pressure, which is preferably on a low order such as eleven inches, an eleven inch vacuum being desired at the teat cup. The slide valve 48 controls the relay operation. When the slide valve 48 is pushed to the right, where there is a non-registry of its passageway 60 with the bore 54 leading from the pipe 53, the diaphragm 40 remains stationary with the valve member 35 seated on the rib 25, this seating being induced by the vacuum within the pipe 17 and the atmospheric pressure in the chamber 24 made available through the openings 42, the chamber 30 and the holes 33. It is to be noted that the internal bore through the nipple 26 is also in this condition subjected to the atmospheric pressure.

For the milking operation, the valve 48 is moved to the left, FIG. 2, to bring the opening 60 into registry, or at least partial registry with the upper bore 54 and the lower opening 60a, whereupon the upper part of the chamber in the carrier 28 above the diaphragm 40 is subjected to the pulsating pressures available in the pipeline 53, when the cycle of the pulsations has the atmospheric pressure, the valve 35 will remain seated to close off any flow through the bore 14. When the vacuum portion of the cycle is produced, the diaphragm 40 will be centrally lifted to that degree where the valve 35 is lifted off of its rib seat 25 and carried upwardly to close by its topside the holes 33. In this manner, the nipple 26 is then subjected to the vacuum pressure of the pipe 17. Then in the next part of the cycle, with the advent of the atmospheric pressure in the pipe 53 the diaphragm 40 is forced downwardly to close off the vacuum connection through the bore 14 and to admit atmospheric pressure to the nipple 26.

Thus it is to be seen that the pulsations through the nipple 26 will vary directly in timing with the pulsations in the pipe 53. By use of the large diameter pipe 17, these intermittent pulsations will not decrease the vacuum in that pipe 17 particularly at the opening into the bore 14 to any appreciable extent, in view of the fact of the existence of the large volume or, as might be stated, a large reservoir of the vacuum in that pipe. The operation is stopped by pushing the slide valve 48 to the right, in which case the slot 61 then is in communication by its inner ends with the opening 60a, allowing atmospheric pressure to enter into the carrier 28 on the topside of the diaphragm 40, thereby serving as a positive means of insuring that the diaphragm 40 operates to close the valve 35 against the rib 25 and preserves the vacuum pressure in the pipe 17. It is to be remembered that there is no communication of the atmospheric pressure through the holes 42 to the topside of the diaphragm 40. The presence of the slot 61 therefore insures against the "hanging up" of the valve member 35 above the seat 25. The diaphragm 40 has a sufficient area exposed within the carrier 28 to exceed the diameter of the valve member 35 sufficiently to insure the raising and lowering of that member 35.

Therefore it is to be seen that I have provided a device extremely simple in its operation, and entirely controlled by the pulsations set up in a controlling pipe line which is not at any time interconnected with the milking claw or the teat cups directly. The device therefore serves in the nature of a servomotor insuring a fixed vacuum pressure at each outlet nipple 26 regardless of the length of the pipe 17 in any normal barn installation whereas the pipe 53 may have a length of fifty feet or less.

Thus while the invention has herein been described in the one particular form, it is obvious that structural changes may be made without departing from the spirit of the invention, and I therefore do not desire to be limited to that precise form beyond the limitations which may be imposed by the following claim.

I claim:

A pulsator relay operated by pulsating pressures from a line to apply continuously, alternately, pressures from a substantially constant pressure line and atmospheric pressure, comprising a body having a vertical bore;

means for connecting said bore to the constant pressure line;

a chamber in said body from which said bore leads;

a seat around said bore;

said body having a side outlet from said chamber;

a diaphragm carrier carried by said body and spaced above said chamber;

a flexible diaphragm fixed across said carrier and sealably dividing the carrier into an upper and a lower chamber;
said carrier lower chamber having at least one passageway leading therefrom and opening into said body chamber and at least one other passageway opening to the atmosphere;
a valve member in said body chamber;
a valve rod carrying said member on its lower end portion and extending upwardly to have its upper portion sealably fixed to said diaphragm;
a passageway leading from said carrier upper chamber to open for connection to said pulsating line;
a slide valve slidingly carried by said carrier intercepting said last passageway;
said slide valve having an opening therethrough selectively registering on each side with said last passageway;
said slide valve having an atmospheric passageway in communication with that portion of said last passageway below said slide valve when the slide valve opening is out of registry with that last passageway;
the registry of said slide valve opening with said last passageway submitting said carrier upper chamber only to the pulsating pressure;
said carrier lower chamber other passageway maintaining at all times substantially atmospheric pressure in that lower chamber below said diaphragm;
up and down flexing of said diaphragm under said pulsating pressure reciprocating said body chamber valve between alternate closing and opening of said body bore and of said one passageway of the carrier lower chamber.

References Cited by the Examiner

UNITED STATES PATENTS

| | | | |
|---|---|---|---|
| 910,163 | 1/09 | Benninghoff | 137—625.25 XR |
| 961,821 | 6/10 | Walker | 137—625.27 |
| 1,501,331 | 7/24 | Gulick | 137—245 |
| 1,529,178 | 3/25 | Greenwood | 137—625.25 |
| 2,840,110 | 6/58 | Parsons | 137—625.27 |
| 2,907,345 | 10/59 | Randall | 137—625.27 XR |

FOREIGN PATENTS 873,099  7/61  Great Britain.

M. CARY NELSON, *Primary Examiner.*
MILTON KAUFMAN, *Examiner.*